(12) United States Patent
Tokutake et al.

(10) Patent No.: US 10,870,587 B2
(45) Date of Patent: Dec. 22, 2020

(54) CUPROUS OXIDE PARTICLE, METHOD OF PRODUCING THE SAME, PHOTOSINTERING COMPOSITION, METHOD OF FORMING CONDUCTIVE FILM USING THE SAME AND PASTE OF CUPROUS OXIDE PARTICLES

(71) Applicant: NIPPON CHEMICAL INDUSTRIAL CO., LTD., Tokyo (JP)

(72) Inventors: Mari Tokutake, Tokyo (JP); Shinji Abe, Tokyo (JP)

(73) Assignee: NIPPON CHEMICAL INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 16/346,222

(22) PCT Filed: Nov. 2, 2017

(86) PCT No.: PCT/JP2017/039701
§ 371 (c)(1),
(2) Date: Apr. 30, 2019

(87) PCT Pub. No.: WO2018/092598
PCT Pub. Date: May 24, 2018

(65) Prior Publication Data
US 2019/0263674 A1 Aug. 29, 2019

(30) Foreign Application Priority Data
Nov. 17, 2016 (JP) .................................. 2016-223969

(51) Int. Cl.
*C01G 3/02* (2006.01)
*H01B 1/22* (2006.01)
(Continued)

(52) U.S. Cl.
CPC ................. *C01G 3/02* (2013.01); *H01B 1/00* (2013.01); *H01B 1/02* (2013.01); *H01B 1/22* (2013.01);
(Continued)

(58) Field of Classification Search
CPC ... H01B 1/00; H01B 1/02; H01B 1/22; H01B 13/003; C01G 3/02; C01G 19/00
(Continued)

(56) References Cited

U.S. PATENT DOCUMENTS

| 7,534,283 B2 * | 5/2009 | Yamada | C22B 15/0021 75/373 |
| 2014/0124713 A1 * | 5/2014 | Majumdar | H01L 29/45 252/513 |

(Continued)

FOREIGN PATENT DOCUMENTS

| CN | 104874400 A | 9/2015 |
| JP | 2007-39729 A | 2/2007 |

(Continued)

OTHER PUBLICATIONS

Zhang ("One-Pot Room Temperature Synthesis of Cu2O/Ag Composite Nanospheres with Enhanced Visible-Light-Driven Photocatalytic Performance." Ind. Eng. Chem. Res. 2014, 53, 16316-16323 (Year: 2014).*

(Continued)

*Primary Examiner* — Tri V Nguyen
(74) *Attorney, Agent, or Firm* — Westerman, Hattori, Daniels & Adrian, LLP

(57) ABSTRACT

Provided is a photosintering composition including cuprous oxide particles containing at least one additive element selected from the group consisting of tin, manganese, vanadium, cerium and silver, and a solvent. It is preferable that the cuprous oxide particle contain 1 ppm to 30,000 ppm of (Continued)

tin as the additive element. It is also preferable that the photosintering composition contain 3% by mass to 80% by mass of the cuprous oxide particles and 20% by mass to 97% by mass of the solvent.

4 Claims, 1 Drawing Sheet

(51) Int. Cl.
    *H01B 13/00*      (2006.01)
    *H01B 1/02*      (2006.01)
    *C01G 19/00*      (2006.01)
    *H01B 1/00*      (2006.01)
    *H01B 5/00*      (2006.01)

(52) U.S. Cl.
    CPC ............. *H01B 5/00* (2013.01); *H01B 13/00* (2013.01); *H01B 13/003* (2013.01); *C01G 19/00* (2013.01); *C01P 2004/03* (2013.01); *C01P 2004/62* (2013.01); *C01P 2004/64* (2013.01); *C01P 2006/40* (2013.01)

(58) Field of Classification Search
    USPC ................. 252/514, 518.1, 520.3, 520.4
    See application file for complete search history.

(56) References Cited

U.S. PATENT DOCUMENTS

2014/0367619 A1* 12/2014 Summers ................ B05D 5/12
                                                  252/512
2018/0027668 A1* 1/2018 Kaizu ..................... H05K 3/12
                                                    174/262

FOREIGN PATENT DOCUMENTS

| JP | 2008-282913 A | 11/2008 | |
|---|---|---|---|
| JP | 2014-5188 A | 1/2014 | |
| JP | 2014-71963 A | 4/2014 | |
| JP | WO2016111133 A * | 7/2016 | ........... H05K 3/4644 |

OTHER PUBLICATIONS

Extended Search Report dated Oct. 25, 2019, issued in counterpart EP Application No. 17870767.5 (7 pages).

Pan, Lu et al., "Synthesis of Ag/Cu2O hybrids and their photocatalytic degradation treatment of p-nitrophenol", Micro & Nano Letters, the Institution of Engineering and Technology, vol. 6, No. 12, Dec. 31, 2011, pp. 1019-1022; Cited in EESR dated Oct. 25, 2019.

Hu, Shichao et al., "Preparation of Cu2O/CeO2 heterojunction photocatalyst for the degradation of Acid Orange 7 under visible light irradiation", Catalysis Communications, Elsevier, vol. 12, No. 9, Jan. 25, 2011, pp. 794-797; Cited in EESR dated Oct. 25, 2019.

Umemura R. et al., "Investigation of Cu2O-Based Diluted Magnetic Semiconductor by Mechanical Milling", Transactions of the Materials Research Society of Japan, vol. 35, No. 2, pp. 247-250; Cited in EESR dated Oct. 25, 2019.

Wei, M. et al, "Room temperature ferromagnetism in bulk Mn-Doped Cu2O", Applied Physics Letters, America Institute of Physics, vol. 86, No. 7, Feb. 11, 2005, pp. 72514-072514; Cited in EESR dated Oct. 25, 2019.

International Search Report dated Feb. 6, 2018, issued in counterpart International Application No. PCT/JP2017/039701 (2 pages).

Deng et al., Morphology transformation of $Cu_2O$ sub-microstructures by Sn doping for enhanced photocatalytic properties, Journal of alloys and compounds, (2015), vol. 649, pp. 1124-1129. Cited in ISR. (6 pages).

Du et al., "Photo-catalytic degradation of trifluralin by $SnO_2$-doped $Cu_2O$ Crystals", Catalysis Communications, (2010), vol. 11, pp. 670-674. Cited in ISR. (5 pages).

Ahmed et al., "Anomalous magnetic behavior in the transition metal ions doped $Cu_2O$ flower-like nanostructures", Journal of Solid State Chemistry, (2011), vol. 184, pp. 30-35. Cited in ISR. (6 pages).

* cited by examiner

US 10,870,587 B2

CUPROUS OXIDE PARTICLE, METHOD OF PRODUCING THE SAME, PHOTOSINTERING COMPOSITION, METHOD OF FORMING CONDUCTIVE FILM USING THE SAME AND PASTE OF CUPROUS OXIDE PARTICLES

TECHNICAL FIELD

The present invention relates to a cuprous oxide particle, a method of producing the same, a photosintering composition, a method of forming a conductive film using the same and a paste of a cuprous oxide particle.

BACKGROUND ART

As a method of forming a conductive film on a substrate, a technique is known in which a dispersion of metal oxide particles is applied to a substrate to form a coating film and then the coating film is sintered by heating or photoirradiation (see, for example, Patent Literature 1). In particular, methods using photoirradiation are advantageous in that the coating film can be sintered at low temperature and the methods are therefore applicable to resin substrates with low heat resistance. As a cuprous oxide particle that can be used in such an application, Patent Literature 2, for example, discloses a cuprous oxide powder having an average primary particle size of 0.5 µm or less as measured by a scanning electron microscope and containing 30 ppm or more of iron, which is obtained by adding either of an alkaline solution or a copper ion-containing solution to which divalent iron ions have been added to the other to form copper hydroxide, and then adding a reducing agent to deposit cuprous oxide particles by reduction.

CITATION LIST

Patent Literature

Patent Literature 1: Japanese Patent Laid-Open No. 2014-71963
Patent Literature 2: Japanese Patent Laid-Open No. 2014-5188

SUMMARY OF INVENTION

Technical Problem

When the present inventors formed a coating film using a dispersion of the cuprous oxide powder described in Patent Literature 2 and performed a reduction treatment of the cuprous oxide powder by irradiating the coating film with light, and it was found that a part of the coating film was scattered and reduction to copper and sintering was insufficient in some portions, and thus a defect-free, uniform conductive film was not obtained.

Thus, an object of the present invention is to provide a photosintering composition which can give a defect-free, uniform conductive film by photoirradiation, and a cuprous oxide particle used as a raw material of the photosintering composition.

Solution to Problem

The present inventors have conducted intensive studies in consideration of the above actual circumstances and, as a result, have found that a cuprous oxide particle containing a specific additive element and a photosintering composition containing the cuprous oxide particle can solve the above problem, thereby completing the present invention.

Accordingly, the present invention provides a cuprous oxide particle containing at least one additive element selected from the group consisting of tin, manganese, vanadium, cerium and silver.

The present invention also provides a photosintering composition comprising the above cuprous oxide particle and a solvent.

Advantageous Effects of Invention

The present invention can provide a photosintering composition which can give a defect-free, uniform conductive film by photoirradiation, and a cuprous oxide particle used as a raw material of the photosintering composition.

DESCRIPTION OF EMBODIMENTS

Figure 1:
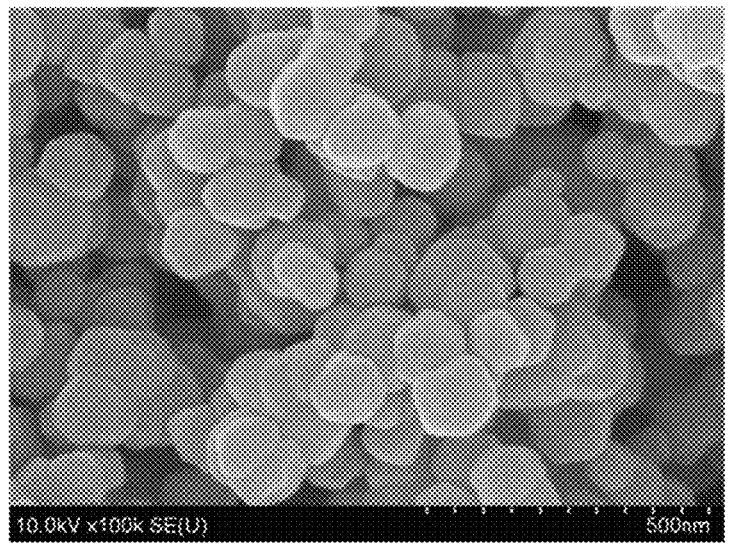
FIG. 1 is an electron micrograph of cuprous oxide particles obtained in Example 1 (100,000 magnifications).

The cuprous oxide particle of the present invention contains at least one additive element selected from the group consisting of tin, manganese, vanadium, cerium and silver. The preferred content of the additive element varies depending on the type of the additive element, and is usually in the range of 1 ppm to 30,000 ppm. When the additive element is tin, the content is preferably 1 ppm to 30,000 ppm, and more preferably 10 ppm to 10,000 ppm from the viewpoint of the solubility of tin ions and control of the particle size of cuprous oxide particles. When the additive element is manganese, the content is preferably 10 ppm to 20,000 ppm, and more preferably 30 ppm to 10,000 ppm from the viewpoint of the solubility of manganese ions and control of the particle size of cuprous oxide particles. When the additive element is vanadium, the content is preferably 10 ppm to 20,000 ppm, and more preferably 30 ppm to 10,000 from the viewpoint of the solubility of vanadium ions and control of the particle size of cuprous oxide particles. When the additive element is cerium, the content is preferably 10 ppm to 20,000 ppm, and more preferably 30 ppm to 10,000 ppm from the viewpoint of the solubility of cerium ions and control of the particle size of cuprous oxide particles. When the additive element is silver, the content is preferably 1 ppm to 30,000 ppm, and more preferably 5 ppm to 20,000 ppm from the viewpoint of the solubility of silver ions and control of the particle size of cuprous oxide particles. Of these additive elements, tin is preferred because it has a low melting point and a low resistance. The content of the additive element in the cuprous oxide particles of the present invention is measured by dissolving 1 g of cuprous oxide in 10 ml of concentrated hydrochloric acid and subjecting the solution to measurement by an ICP emission spectrometer (ICPS-8100 made by Shimadzu Corporation).

The average primary particle size of the cuprous oxide particles is preferably 1 nm to 1,000 nm, and more preferably 30 nm to 500 nm from the viewpoint of handleability and photosintering properties. The average primary particle size of the cuprous oxide particles may be adjusted based on conditions such as the concentration of ions to be added and the temperature at which a copper ion-containing aqueous solution and an alkaline solution are mixed in the production of cuprous oxide particles described later. The average primary particle size of the cuprous oxide particles according to the present invention means a value obtained by measuring the primary particle size of 50 cuprous oxide particles randomly selected in an image of cuprous oxide particles observed by a scanning electron microscope (SEM) and arithmetically averaging the values. Furthermore, the shape of the cuprous oxide particle is not particularly limited, and may be spherical polyhedral or irregular.

The cuprous oxide particles of the present invention may be produced by a method in which an aqueous solution containing copper ions and at least one additive ion selected from the group consisting of a divalent tin ion, a divalent manganese ion, a tetravalent vanadium ion, a trivalent cerium ion and a monovalent silver ion is mixed with an alkaline solution to form copper hydroxide, and then a reducing agent is added thereto to deposit cuprous oxide particles by reduction. It is preferable that when forming copper hydroxide and depositing cuprous oxide particles by reduction, the reaction solution be stirred so that the reaction solution becomes homogeneous.

Copper chloride, copper sulfate, copper nitrate, copper acetate, copper cyanide, copper thiocyanate, copper fluoride, copper bromide, copper iodide, copper carbonate, copper phosphate, copper fluoroborate, copper hydroxide, copper pyrophosphate and a hydrate thereof may be used as a copper ion source contained in the aqueous solution. These copper ion sources may be used singly or in combinations of two or more. Of these copper ion sources, copper chloride and copper sulfate are preferably used because they have high solubility in water and are inexpensive. The concentration of copper ions in the aqueous solution is preferably 0.1 mol/L to 2 mol/L from the viewpoint of reaction efficiency. When the concentration of copper ions is less than 0.1 mol/L, reaction efficiency may be reduced and the yield of cuprous oxide may be reduced. By contrast, when the concentration of copper ions is more than 2 mol/L, coagulation is likely to occur.

At least one additive ion selected from the group consisting of a divalent tin ion, a divalent manganese ion, a trivalent vanadium ion, a tetravalent vanadium ion, a trivalent cerium ion and a monovalent silver ion, which are contained in the aqueous solution, has the effect of reducing the average primary particle size of the resulting cuprous oxide particles and improving properties of reduction to copper and sintering. Tin (II) chloride, tin (II) sulfate, tin (II) oxide, tin (II) fluoride, tin (II) bromide, tin (II) iodide, an organic tin compound and a hydrate thereof may be used as a divalent tin ion source. These may be used singly or in combinations of two or more. Manganese (II) acetate, manganese (II) sulfate, manganese (II) chloride, manganese (II) nitrate and a hydrate thereof may be used as a divalent manganese ion source. These may be used singly or in combinations of two or more. Vanadium (IV) oxysulfate, vanadium (IV) tetrachloride, vanadium (IV) oxychloride, vanadium (III) chloride, vanadium (III) oxide, vanadium (IV) oxide and a hydrate thereof may be used as a tetravalent vanadium ion source. These may be used singly or in combinations of two or more. Cerium (III) chloride, cerium (III) oxide, cerium (III) nitrate, cerium (III) sulfate, cerium (III) fluoride, cerium (III) bromide, cerium (III) iodide, cerium (III) oxalate, cerium (III) acetate and a hydrate thereof may be used as a trivalent cerium ion source. These may be used singly or in combinations of two or more. Silver (I) citrate, silver (I) chromate, silver (I) dichromate, silver (I) acetate, silver (I) oxide, silver (I) oxide, potassium dicyanoargentate (I), silver (I) cyanide, silver (I) bromide, silver (I) nitrate, silver (I) selenate, silver (I) tungstate, silver (I) carbonate, silver (I) thiocyanate, silver (I) telluride, silver (I) lactate, silver (I) fluoride, silver (I) molybdate, silver (I) iodide, silver (I) formate, silver (I) sulfide, silver (I) sulfate, silver (I) phosphate, silver (I) diphosphate, silver (I) nitrite, silver (I) benzoate, silver (I) isocyanate, silver (I) chloride, silver (I) perchlorate and a hydrate thereof may be used as a monovalent silver ion source. These may be used singly or in combinations of two or more. The concentration of additive ions in the aqueous solution is not particularly limited as long as the concentration allows the content of the additive element in the cuprous oxide particles finally obtained to fall within the preferred range described above. It is preferable that the concentration be 0.001 mol to 0.1 mol based on 1 mol of copper ions from the viewpoint that the additive ion is easily incorporated into cuprous oxide to form a co-deposit and the co-deposit facilitates photosintering. The average primary particle size of the cuprous oxide particles finally obtained can be controlled by changing the concentration of the additive ion. More specifically, the higher the concentration of the additive ion, the more the average primary particle size of the cuprous oxide particles can be reduced.

A usual alkaline solution prepared by dissolving alkali such as sodium hydroxide, potassium hydroxide and lithium hydroxide in water may be used as the alkaline solution. It is preferable that the concentration of alkali be 0.1 mol to 10 mol based on 1 mol of copper ions contained in the copper ion-containing aqueous solution to be mixed with the alkaline solution from the viewpoint of control of the particle size of the cuprous oxide particles finally obtained and control of reduction reaction. When the concentration is less than 0.1 mol, reduction to cuprous oxide may be insufficient and reaction efficiency may be reduced. By contrast, when the concentration is more than 10 mol, a part of cuprous oxide may be even reduced to copper.

The reaction temperature at which the copper ion-containing aqueous solution is mixed with the alkaline solution to form copper hydroxide is not particularly limited. The reaction temperature may be 10° C. to 100° C. and is preferably 30° C. to 95° C. from the viewpoint of control of the reaction. The average primary particle size of the cuprous oxide particles finally obtained can be controlled by changing the reaction temperature at this stage. More specifically, the average primary particle size of the cuprous oxide particles can be increased by raising the reaction temperature. The reaction time is not particularly limited, and may be more than 0 minute and 120 minutes or less because copper hydroxide may be formed immediately after mixing depending on the concentration of copper ions, the type and the concentration of the alkaline solution and the reaction temperature. When the reaction time is more than 120 minutes, copper oxide is gradually formed from copper hydroxide due to the action of additive ions.

Glucose, fructose, maltose, lactose, hydroxylamine sulfate, hydroxylamine nitrate, sodium sulfite, sodium hydrogen sulfite, sodium dithionite, hydrazine, hydrazine sulfate, hydrazine phosphate, hypophosphoric acid, sodium hypophosphate, sodium borohydride and the like may be used as a reducing agent. Of these reducing agents, reducing sugars such as glucose and fructose are preferred because they are inexpensive, easily available, can be easily handled and have high efficiency of reduction to cuprous oxide. The amount of the reducing agent added is preferably 0.1 mol to 10 mol based on 1 mol of copper ions from the viewpoint of control of reduction reaction from copper hydroxide to cuprous oxide. When the amount of the reducing agent added is less than 0.1 mol, the reduction reaction from copper hydroxide to cuprous oxide may be insufficient. By contrast, when the amount of the reducing agent added is more than 10 mol, excess reducing agent may reduce even a part of cuprous oxide to copper.

The reaction temperature for reduction and deposition is not particularly limited. The temperature may be 10° C. to 100° C. and is preferably 30° C. to 95° C. from the viewpoint of control of the reaction. Here, the reaction time is not particularly limited, and may be usually 5 minutes to 120 minutes. When the time of reduction and deposition is less than 5 minutes, reduction reaction from copper hydroxide to cuprous oxide may be insufficient. On the other hand, when the time of reduction and deposition is more than 120 minutes, a part of the cuprous oxide deposited may be oxidized to copper oxide.

A slurry containing cuprous oxide particles deposited is filtered and the resultant is washed with water to give a cuprous oxide cake. Methods of filtration and water washing include a method of water washing while particles are fixed with a filter press and the like, a method in which operation of decanting slurry, removing the supernatant, then adding pure water thereto, stirring the mixture, then decanting the solution again, and removing supernatant is repeated, and a method in which operation of repulping cuprous oxide particles after filtration and then filtering again is repeated. The resulting cuprous oxide particles may be subjected to a treatment for preventing oxidation if necessary. For example, the treatment for preventing oxidation is performed using an organic substance such as saccharide, polyhydric alcohol, rubber, peptonic, carboxylic acid, phenol, paraffin and mercaptan, or an inorganic substance such as silica. The resulting cuprous oxide cake is then dried in an atmosphere and at a temperature where cuprous oxide is not reduced to copper and not oxidized to copper oxide (e.g. in vacuum at 30° C. to 150° C.) to give cuprous oxide particles. The resulting cuprous oxide particles may be subjected to a treatment such as crashing and sieving if necessary.

The cuprous oxide particles of the present invention obtained as described above have excellent properties of reduction to copper and sintering by photoirradiation and thus are useful as a raw material of a photosintering composition, and may also be used in the field of, for example, ship bottom coatings, raw materials of copper powder, raw materials of antifouling coating, microbicides, pesticides, conductive coatings, colorants and catalysts. Paste of cuprous oxide particles obtained by mixing the cuprous oxide particles of the present invention and a solvent can be used as not only a photosintering composition but also a heat sintering composition.

Next, cases of using the cuprous oxide particle of the present invention as a raw material of a photosintering composition will be described.

The photosintering composition according to the present invention comprises the cuprous oxide particle mentioned above and a solvent. The photosintering composition of the present invention may be used as not only a material for forming a conductive film but also a material for forming copper wiring, a copper joining material, an alternative material for copper plating, a material for rectifiers, a material for solar cells and the like. Preferably 3% by mass to 80% by mass, more preferably 5% by mass to 60% by mass of the cuprous oxide particles are contained based on the photosintering composition from the viewpoint of suppressing an increase in the viscosity and forming a sufficiently thick conductive film. When the content of the cuprous oxide particles is less than 3% by mass, a sufficiently thick coating film may not be obtained even by applying the photosintering composition to a substrate and the conductive film may not be continuous after photosintering. By contrast, when the content of the cuprous oxide particles is more than 80% by mass, the amount of solid components increases to increase the viscosity of the photosintering composition, making application to a substrate difficult in some cases. Preferably 20% by mass to 97% by mass, more preferably 40% by mass to 95% by mass of a solvent is contained based on the photosintering composition from the viewpoint of suppressing an increase in the viscosity, handleability and photosintering properties.

The solvent is not particularly limited and may be inorganic or organic as long as it serves as a dispersion medium for cuprous oxide particles. Examples of solvents include water, monohydric alcohol, polyhydric alcohols such as dihydric alcohol and trihydric alcohol, ethers and esters. Specific examples of solvents other than water include methanol, ethanol, propanol, isopropyl alcohol, isobutanol, 1,3-propanediol, 1,2,3-propanetriol (glycerol), ethylene glycol, diethylene glycol, triethylene glycol, dipropylene glycol, ethylene glycol monomethyl ether, ethylene glycol monoethyl ether, ethylene glycol monopropyl ether, diacetone alcohol, ethylene glycol monobutyl ether, propylene glycol, diethylene glycol monomethyl ether, diethylene glycol monoethyl ether, dipropylene glycol monopropyl ether, diethylene glycol monobutyl ether (butylcarbitol), tripropylene glycol, triethylene glycol monoethyl ether, terpineol, dihydroterpineol, dihydroterpinyl monoacetate, methyl ethyl ketone, cyclohexanone, ethyl lactate, propylene glycol monomethyl ether acetate, diethylene glycol monomethyl ether acetate, diethylene glycol monobutyl ether acetate, ethylene glycol monomethyl ether acetate, ethylene glycol monobutyl ether acetate, dibutyl ether, octane and toluene. These solvents may be used singly or in combinations of two or more.

Of these solvents, water is preferred from the viewpoint of handleability, drying properties of coating film and viscosity. Terpineol and dihydroterpineol are preferred from the viewpoint of dispersing components in the photosintering composition well.

The photosintering composition of the present invention may contain an additional component in addition to the cuprous oxide particle and the solvent. Examples of such additional components include a binder resin, a dispersant, a protective agent, a viscosity adjusting agent, an anti-settling agent, a thixotropy imparting agent, a reducing agent, an affinity agent for a substrate on which a conductive film is formed and a sintering auxiliary. It is preferable that these additional components be removed by evaporation in the step of drying or by gasification in the step of sintering. Compounds composed of carbon, hydrogen, oxygen and nitrogen are particularly preferred.

Specific examples of the binder resin include a cellulose resin and derivatives thereof, polyurethane, a polyester resin, polyvinylpyrrolidone, a poly-N-vinyl compound, a chlorinated polyolefin resin, a polyacrylic resin, an epoxy resin, an epoxy acrylate resin, a phenol resin, a melamine resin, a urea resin, an alkyd resin, polyvinyl alcohol, polyvinyl butyral, α-methyl styrene polymer, a terpene resin, a terpene phenol resin, a petroleum resin, a hydrogenated petroleum resin, a cyclopentadiene petroleum resin, a polybutadiene resin, a polyisoprene resin, a polyether resin and ethylene oxide polymer. A binder resin is usually dissolved in a solvent to be used. These binder resins may be used singly or in combinations of two or more. Resins that improve adhesion properties to a substrate, dissolve in a solvent at high concentration, have a function of a reducing agent, and can provide a conductive film having good conductivity are preferred as the binder resin. Furthermore, since the viscosity of the composition can be adjusted by mixing a binder resin, the viscosity of the composition can be adjusted so as to be suitable for various printing applications such as inkjet printing and screen printing. Of them, ethyl cellulose, an acrylic resin and an epoxy resin are particularly preferred from the viewpoint of coating properties, adhesion properties and photosintering properties, although they have different levels of effect.

The content of the binder resin may be within the range of 20% by mass to 97% by mass in total including the solvent described above based on the photosintering composition. Preferably 0.01% by mass to 40% by mass, and more preferably 0.2% by mass to 30% by mass of binder resin is contained in the photosintering composition from the viewpoint of improving coating properties and adhesion properties. When the content of the binder resin is more than 40% by mass, the viscosity of the composition increases and a good coating film may not be formed. Furthermore, the binder resin remains in the conductive film after photosintering as a redundant resin and may cause an increase in the resistance value of the conductive film.

The method of forming a conductive film of the present invention includes a step of applying the photosintering composition described above to a substrate to form a coating film and a step of irradiating the coating film with light to reduce cuprous oxide particles in the coating film.

Materials of substrates on which a conductive film is formed are not particularly limited. Examples thereof include resin such as polyethylene terephthalate, polyimide and polyethylene naphthalate; glass such as quartz glass, soda glass and alkali-free glass; metals such as iron, copper and aluminum; semimetals such as silicon and germanium; ceramics such as alumina, zirconia, silicon nitride and silicon carbide; and paper. Since substrates are not excessively heated in the method of forming a conductive film of the present invention, the method is suitable for forming a conductive film on a resin substrate with a low heat resistance.

A suitable method may be selected as a method of applying the photosintering composition to a substrate depending on, for example, the viscosity of the photosintering composition and the average primary particle size of cuprous oxide particles. Specific examples of methods of coating include a bar coating method, a spray coating method, a spin coating method, a dip coating method, a roll coating method, an inkjet printing method, a gravure printing method and a screen printing method. The thickness of the coating film may be appropriately determined based on the thickness of the intended conductive film, and is preferably 0.1 μm to 100 μm from the viewpoint of sintering properties and adhesion properties. When the thickness of the coating film is less than 0.1 μm, the conductive film is unlikely to be continuous due to volume contraction of cuprous oxide particles after sintering, and sufficient conductivity may not be obtained. By contrast, when the thickness of the coating film is more than 100 μm, photoirradiation energy does not reach the bottom part of the coating film and only the surface is sintered, and thus the conductive film is easily separated from the substrate.

It is preferable that the method of forming a conductive film of the present invention also include a step of drying a coating film after forming the coating film. Removal of solvent remaining in the coating film by drying makes it possible to reduce generation of defects in the conductive film in the step of reduction described later. For drying the coating film, a known dryer such as an air dryer and a warm air dryer may be used. For the condition of drying of the coating film, the coating film is dried usually at 60° C. to 120° C. for 5 minutes to 60 minutes.

To reduce cuprous oxide particles in the coating film to copper and sinter them, the coating film may be irradiated with light using a known photoirradiation apparatus. For photoirradiation, pulsed light irradiation is preferred from the viewpoint that temperature can be easily controlled. Pulsed light irradiation with a flash lamp is preferred as pulsed light irradiation, and pulsed light irradiation with a xenon (Xe) flash lamp is more preferred. Examples of apparatus which can perform such pulsed light irradiation include S-series xenon pulsed light system made by Xenon Corporation and apparatus made by Novacentrix. S-2300 by Xenon Corporation, in particular, allows a simple setting of pulsed light of voltage 1/pulse width 1 in a single pulse, and also has a function of sequentially setting voltage 2/pulse width 2 after voltage 1/pulse width 1 in a single pulse, and thus continuous pulsed light irradiation in two or more steps in different conditions are available. As described above, being capable of controlling irradiation energy for sintering, S-2300 by Xenon Corporation is suitable for sintering cuprous oxide. The number of steps is not particularly limited as long as cuprous oxide can be sintered, and a plurality of steps may be set.

The irradiation energy and the pulse width of pulsed light may be appropriately selected based on the average primary particle size of cuprous oxide particles, the type and the concentration of solvent, the thickness of coating film, the type of additives and the like so that cuprous oxide can be reduced to copper and sintered. More specifically, accumulated pulsed light irradiation energy for sintering is preferably 0.001 $J/cm^2$ to 100 $J/cm^2$, more preferably 0.01 $J/cm^2$ to 30 $J/cm^2$ from the viewpoint of sufficient sintering and reducing damage on the substrate. When the accumulated pulse irradiation energy is less than 0.001 $J/cm^2$, cuprous oxide particles may not be sufficiently sintered, while when it is more than 100 $J/cm^2$, cuprous oxide particles may be scattered and damage on the substrate may be increased depending on the pulse width. The pulse width of the pulsed light is preferably 1 μ second to 100 m seconds, more preferably 10 μ seconds to 10 m seconds from the viewpoint of sufficient sintering and reducing damage on the substrate. When the pulse width is less than 1 μ second, cuprous oxide particles may not be sufficiently sintered, while when it is more than 100 m seconds, cuprous oxide particles may be scattered and damage on the substrate may be increased depending on the irradiation energy.

The number of times of irradiation of pulsed light is not particularly limited as long as cuprous oxide can be sintered. The same irradiation pattern may be repeated a few times or various irradiation patterns may be repeated a few times. It is preferable that cuprous oxide be sintered by 5 times or less of irradiation from the viewpoint of productivity and damage on the substrate, but the number of the times is not limited thereto depending on the type of the substrate.

Furthermore, the atmosphere in which pulsed light irradiation is performed is not particularly limited, and may be performed in any one of air atmosphere, inert gas atmosphere and reducing gas atmosphere.

EXAMPLES

Hereinafter, the present invention will be described with reference to Examples, but the present invention is not limited to these Examples.

Example 1

25.0 g of a 48% by mass aqueous sodium hydroxide solution and 100.0 g of pure water were put in a 500 mL reaction vessel, and the temperature inside the reaction vessel was adjusted to 40° C. with stirring the content of the reaction vessel to prepare an alkaline solution.

Meanwhile, 17.3 g (0.1 mol) of copper (II) chloride dihydrate, 80.0 g of pure water and 0.45 g (0.002 mol) of tin (II) chloride dihydrate which was a divalent tin ion source were put in a 100 mL glass beaker to prepare an aqueous solution containing copper ions and divalent tin ions. The aqueous solution containing copper ions and divalent tin ions were added to the reaction vessel over about 2 minutes with maintaining the temperature in the reaction vessel at 40° C., and then the mixture was stirred for 10 minutes to deposit copper hydroxide.

10.0 g of glucose and 15.0 g of pure water were put in a 100 mL glass beaker to prepare a reducing agent solution. The reducing agent solution was added to the reaction vessel over about 30 seconds, and then the temperature in the reaction vessel was increased to 50° C. and the temperature was maintained for 15 minutes. Then, the stirring in the reaction vessel was stopped, and the slurry was filtered and washed to prepare a cake. The cake was vacuum dried at 80° C. for 3 hours to give cuprous oxide particles of Example 1. An electron micrograph (SEM) of the cuprous oxide particles obtained in Example 1 is shown in FIG. 1. The average primary particle size of the cuprous oxide particles was determined to be 120 nm from the image observed by the SEM. Furthermore, the content of tin in the cuprous oxide particles was 570 ppm.

Example 2

Cuprous oxide particles of Example 2 were obtained in the same manner as in Example 1 except for changing the amount of tin (II) chloride dihydrate added to 0.225 g (0.001 mol). The average primary particle size of the cuprous oxide particles of Example 2 was 160 nm and the content of tin was 320 ppm.

Example 3

Cuprous oxide particles of Example 3 were obtained in the same manner as in Example 1 except for changing the amount of tin (II) chloride dihydrate added to 1.128 g (0.005 mol). The average primary particle size of the cuprous oxide particles of Example 3 was 80 nm and the content of tin was 1,260 ppm.

Example 4

Cuprous oxide particles of Example 4 were obtained in the same manner as in Example 1 except for changing the amount of tin (II) chloride dihydrate added to 2.257 g (0.01 mol). The average primary particle size of the cuprous oxide particles of Example 4 was 60 nm and the content of tin was 1,660 ppm.

Example 5

Cuprous oxide particles of Example 5 were obtained in the same manner as in Example 1 except for using 0.490 g (0.002 mol) of manganese (II) acetate tetrahydrate instead of 0.45 g (0.002 mol) of tin (II) chloride dihydrate. The average primary particle size of the cuprous oxide particles of Example 5 was 108 nm and the content of manganese was 2,180 ppm.

Example 6

Cuprous oxide particles of Example 6 were obtained in the same manner as in Example 1 except for using 0.482 g (0.002 mol) of manganese (II) sulfate pentahydrate instead of 0.45 g (0.002 mol) of tin (II) chloride dihydrate. The average primary particle size of the cuprous oxide particles of Example 6 was 110 nm and the content of manganese was 2,000 ppm.

Example 7

Cuprous oxide particles of Example 7 were obtained in the same manner as in Example 1 except for using 0.60 g (0.002 mol) of vanadium (IV) oxysulfate n-hydrate instead of 0.45 g (0.002 mol) of tin (II) chloride dihydrate. The average primary particle size of the cuprous oxide particles of Example 7 was 90 nm and the content of vanadium was 870 ppm.

Example 8

Cuprous oxide particles of Example 8 were obtained in the same manner as in Example 1 except for using 0.745 g (0.002 mol) of cerium (III) chloride heptahydrate instead of 0.45 g (0.002 mol) of tin (II) chloride dihydrate. The average primary particle size of the cuprous oxide particles of Example 8 was 180 nm and the content of cerium was 21,000 ppm.

Example 9

Cuprous oxide particles of Example 9 were obtained in the same manner as in Example 1 except for using 0.34 g (0.002 mol) of silver nitrate instead of 0.45 g (0.002 mol) of tin (II) chloride dihydrate. The average primary particle size of the cuprous oxide particles of Example 9 was 140 nm and the content of silver was 2,500 ppm.

Comparative Example 1

Figure 2:
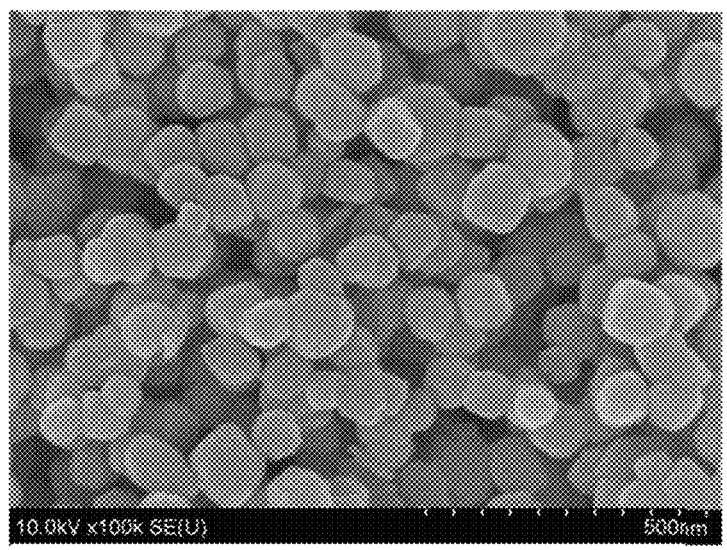
FIG. 2 is an electron micrograph of cuprous oxide particles obtained in Comparative Example 1 (100,000 magnifications).

Cuprous oxide particles of Comparative Example 1 were obtained in the same manner as in Example 1 except for using 0.695 g (0.0025 mol) of iron (II) sulfate heptahydrate instead of 0.45 g (0.002 mol) of tin (II) chloride dihydrate. An electron micrograph (SEM) of the cuprous oxide particles obtained n Comparative Example 1 is shown in FIG. 2. The average primary particle size of the cuprous oxide particles was determined to be 100 nm from the image observed by the SEM. Furthermore, the content of iron in the cuprous oxide particles was 1,380 ppm.

<Formation of Photosintering Composition and Formation of Conductive Film by Photoirradiation>

Of the cuprous oxide particles obtained, the cuprous oxide particles of Examples 1, 3 and 4 and Comparative Example 1 were used to prepare a photosintering composition, and a conductive film was formed.

More specifically, the cuprous oxide particles, the binder resin and the solvent shown in Table 1 were kneaded using a kneader at atmospheric pressure for 30 minutes at 1,000 rpm to prepare a paste of a photosintering composition. The photosintering composition was applied to a polyimide substrate (Kapton (registered trademark) 500H made by DuPont-Toray Co., Ltd.) by screen printing in a 2 mm×20 mm rectangular pattern to form a coating film having a thickness of 5 µm. The coating film was dried in air atmosphere at 80° C. for 10 minutes. The coating film formed on the polyimide substrate was irradiated with 2 pulses of pulsed light using a xenon pulsed light system (S-2300 made by Xenon Corporation) (voltage 1: 3,000 V, pulse width 1: 500 microseconds, voltage 2: 1,800 V, pulse width 2: 8,000 microseconds) to form a conductive film. The presence or absence of defects on the conductive film formed was visually observed, and the volume resistivity of the conductive film was measured by using a low resistivity meter (Loresta (registered trademark)-GPMCP-T600 made by Mitsubishi Chemical Aanalytech Co., Ltd.). The results are shown in Table 2.

TABLE 1

| Photosintering composition | Cuprous oxide particles Type | Content (% by mass) | Binder resin Type | Content (% by mass) | Solvent Type | Content (% by mass) |
|---|---|---|---|---|---|---|
| 1 | Example 1 | 42 | — | — | Water | 58 |
| 2 | Example 3 | 42 | — | — | Water | 58 |
| 3 | Example 4 | 42 | — | — | Water | 58 |
| 4 | Example 1 | 50 | — | — | Terpineol | 50 |
| 5 | Example 1 | 50 | — | — | Butylcarbitol | 50 |
| 6 | Example 1 | 50 | EC-50 | 2 | Terpineol | 48 |
| 7 | Example 1 | 50 | EC-50 | 2 | Butylcarbitol | 48 |
| 8 | Example 3 | 50 | EC-50 | 2 | Terpineol | 48 |
| 9 | Example 4 | 50 | EC-50 | 2 | Terpineol | 48 |
| 10 | Example 1 | 50 | EC-50 | 0.1 | Terpineol | 49.9 |
| 11 | Example 1 | 50 | EC-50 | 20 | Terpineol | 30 |
| 12 | Example 1 | 50 | EC-100 | 2 | Terpineol | 48 |
| 13 | Example 1 | 50 | EC-200 | 2 | Terpineol | 48 |
| 14 | Example 1 | 50 | PVPK-30 | 5 | Terpineol | 45 |
| 15 | Example 1 | 50 | PVPK-90 | 5 | Terpineol | 45 |
| 16 | Example 1 | 50 | Acrylic resin | 5 | Terpineol | 45 |
| 17 | Example 1 | 50 | Epoxy resin | 5 | Terpineol | 45 |
| 18 | Example 1 | 50 | Urethane resin | 5 | Terpineol | 45 |
| 19 | Example 1 | 5 | EC-50 | 2 | Terpineol | 93 |
| 20 | Example 1 | 80 | EC-50 | 1 | Terpineol | 19 |
| 21 | Example 1 | 50 | — | — | Water / Ethylene glycol | 25 / 25 |
| 22 | Example 1 | 50 | — | — | Water / Glycerol | 25 / 25 |
| 23 | Example 1 | 50 | — | — | Water / Ethanol | 25 / 25 |
| 24 | Comparative Example 1 | 42 | — | — | Water | 58 |

Details of the components in Table 1 are as follows.

Terpineol: Mixture of α-, β-, and γ-terpineol isomers

PVP K-30: PITZCOL K-30 made by DKS Co., Ltd. (average molecular weight 45,000)

PVP K-90: PITZCOL K-90 made by DKS Co., Ltd. (average molecular weight 1,200,000)

EC-50: Ethylcellulose STD 50CPS made by The Dow Chemical Company

EC-100: Ethylcellulose STD 100CPS made by The Dow Chemical Company

EC-200: Ethylcellulose STD 200CPS made by The Dow Chemical Company

Acrylic resin: OLYCOX 1100 made by Kyoeisha Chemical Co., Ltd.

Epoxy resin: JER 828 made by Mitsubishi Chemical Corporation (epoxy equivalent 184 to 194)

Urethane resin: KL-424 made by Arakawa Chemical Industries, Ltd.

TABLE 2

| Photosintering composition used | Presence of defects | Volume resistivity [Ω · cm] |
|---|---|---|
| 1 | No defect, uniform | $2.6 \times 10^{-5}$ |
| 2 | No defect, uniform | $4.0 \times 10^{-5}$ |
| 3 | No defect, uniform | $3.1 \times 10^{-5}$ |
| 4 | No defect, uniform | $2.5 \times 10^{-5}$ |
| 5 | No defect, uniform | $3.0 \times 10^{-5}$ |
| 6 | No defect, uniform | $2.9 \times 10^{-5}$ |
| 7 | No defect, uniform | $3.3 \times 10^{-5}$ |
| 8 | No defect, uniform | $4.3 \times 10^{-5}$ |
| 9 | No defect, uniform | $4.6 \times 10^{-5}$ |
| 10 | No defect, uniform | $4.0 \times 10^{-5}$ |
| 11 | No defect, uniform | $8.8 \times 10^{-5}$ |
| 12 | No defect, uniform | $3.9 \times 10^{-5}$ |
| 13 | No defect, uniform | $4.6 \times 10^{-5}$ |
| 14 | No defect, uniform | $3.2 \times 10^{-5}$ |

TABLE 2-continued

| Photosintering composition used | Presence of defects | Volume resistivity [Ω · cm] |
|---|---|---|
| 15 | No defect, uniform | $3.9 \times 10^{-5}$ |
| 16 | No defect, uniform | $3.7 \times 10^{-5}$ |
| 17 | No defect, uniform | $5.4 \times 10^{-5}$ |
| 18 | No defect, uniform | $7.0 \times 10^{-5}$ |
| 19 | No defect, uniform | $9.2 \times 10^{-5}$ |
| 20 | No defect, uniform | $2.6 \times 10^{-5}$ |
| 21 | No defect, uniform | $4.6 \times 10^{-5}$ |
| 22 | No defect, uniform | $3.3 \times 10^{-5}$ |
| 23 | No defect, uniform | $5.6 \times 10^{-5}$ |
| 24 | Defect present (scattering of paste) | $6.3 \times 10^{-5}$ |

As is evident from the results of Table 2, a defect-free and uniform conductive film was formed with the pastes to which the cuprous oxide particles of Examples 1, 3 or 4 were mixed. In contrast, in the case of the paste to which the cuprous oxide particles of Comparative Example 1 were mixed, defects which were considered to be formed due to scattering of the paste were found in the conductive film.

The invention claimed is:

1. A photosintering composition comprising a cuprous oxide particle, and a solvent, and a binder resin,
   wherein the cuprous oxide particle comprises at least one additive element selected from the group consisting of tin, manganese, vanadium, cerium and silver.

2. The photosintering composition according to claim 1, comprising 3% by mass to 80% by mass of the cuprous oxide particle and 20% by mass to 97% by mass of the solvent.

3. The photosintering composition according to claim 1, comprising 3% by mass to 80% by mass of the cuprous oxide particle and 20% by mass to 97% by mass of the solvent and the binder resin in total.

4. A method of forming a conductive film, comprising the steps of:
   applying the photosintering composition according to claim 1 to a substrate to form a coating film; and
   irradiating the coating film with light to reduce cuprous oxide particles in the coating film.

* * * * *